(No Model.) 3 Sheets—Sheet 1.

M. SORENSON.
CORN HARVESTER.

No. 525,393. Patented Sept. 4, 1894.

Witnesses.
Inventor.
Martinus Sorenson,
By Benedict & Morsell
Attorneys.

(No Model.) 3 Sheets—Sheet 2.

M. SORENSON.
CORN HARVESTER.

No. 525,393. Patented Sept. 4, 1894.

Witnesses.
O. N. Keeny
Anna V. Faust

Inventor.
Martinus Sorenson,
By Benedict & Morsell
Attorneys.

(No Model.) 3 Sheets—Sheet 3.

M. SORENSON.
CORN HARVESTER.

No. 525,393. Patented Sept. 4, 1894.

Witnesses.

Inventor.
Martinus Sorenson,
By Benedict & Morsell
Attorneys.

UNITED STATES PATENT OFFICE.

MARTINUS SORENSON, OF RACINE, WISCONSIN, ASSIGNOR OF ONE-FOURTH TO CHRIST. C. MATTSON, OF SAME PLACE.

CORN-HARVESTER.

SPECIFICATION forming part of Letters Patent No. 525,393, dated September 4, 1894.

Application filed March 12, 1894. Serial No. 503,289. (No model.)

*To all whom it may concern:*

Be it known that I, MARTINUS SORENSON, of Racine, in the county of Racine and State of Wisconsin, have invented a new and useful Improvement in Corn-Harvesters, of which the following is a description, reference being had to the accompanying drawings, which are a part of this specification.

My invention has relation to improvements in corn harvesters.

The object of the invention is to provide a construction whereby two rows of corn are cut at a time, the stalks as they are severed being automatically carried to the rear of the machine, where they are separated into convenient divisions for tying into shocks, the shocks, when tied, being by simple mechanism deposited butt down upon the surface of the earth.

With the above primary object, and others, in view the invention consists of the devices and parts, or their equivalents, as hereinafter described and claimed.

Figure 1:
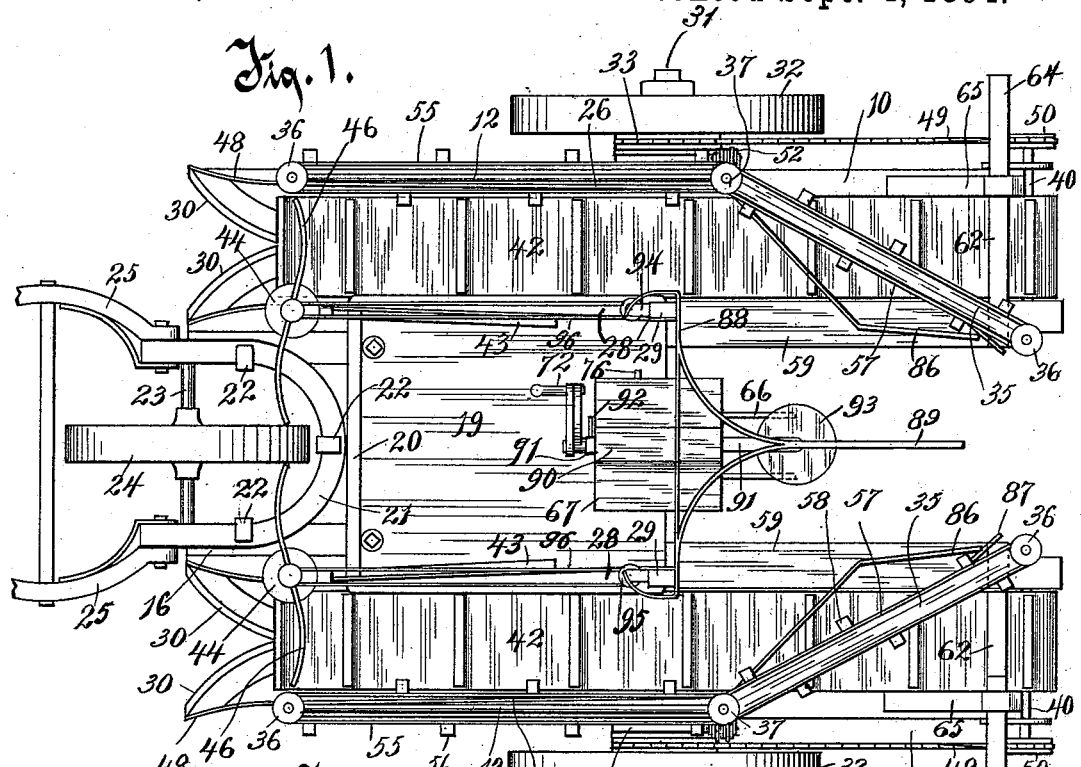
Figure 2:
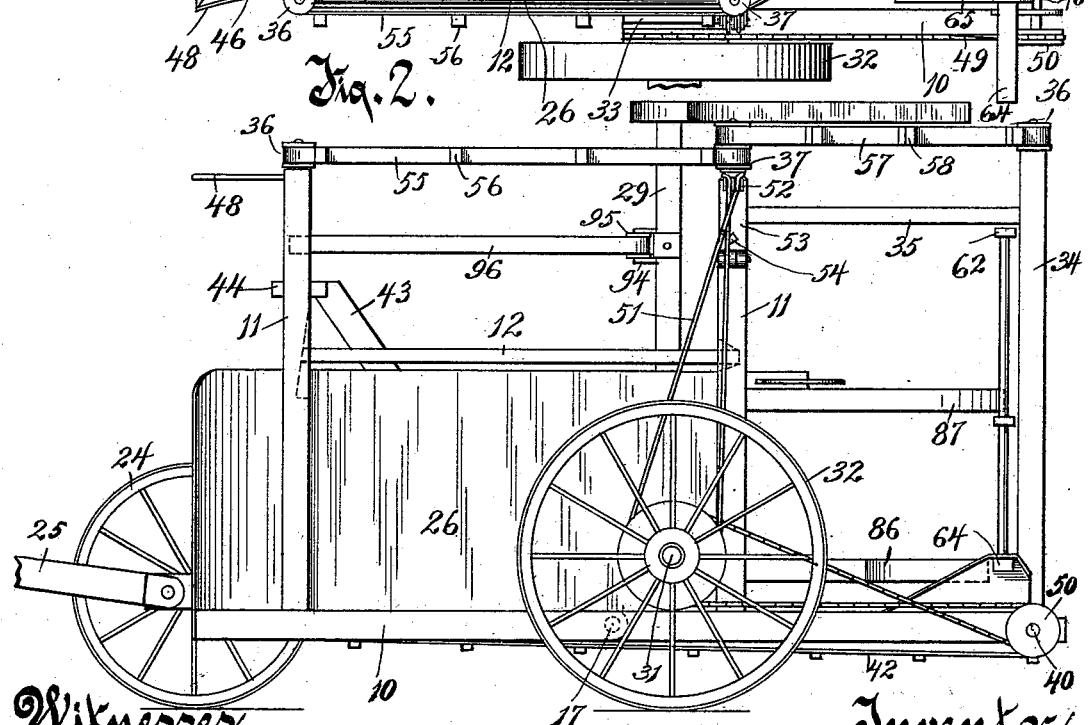
Figure 3:
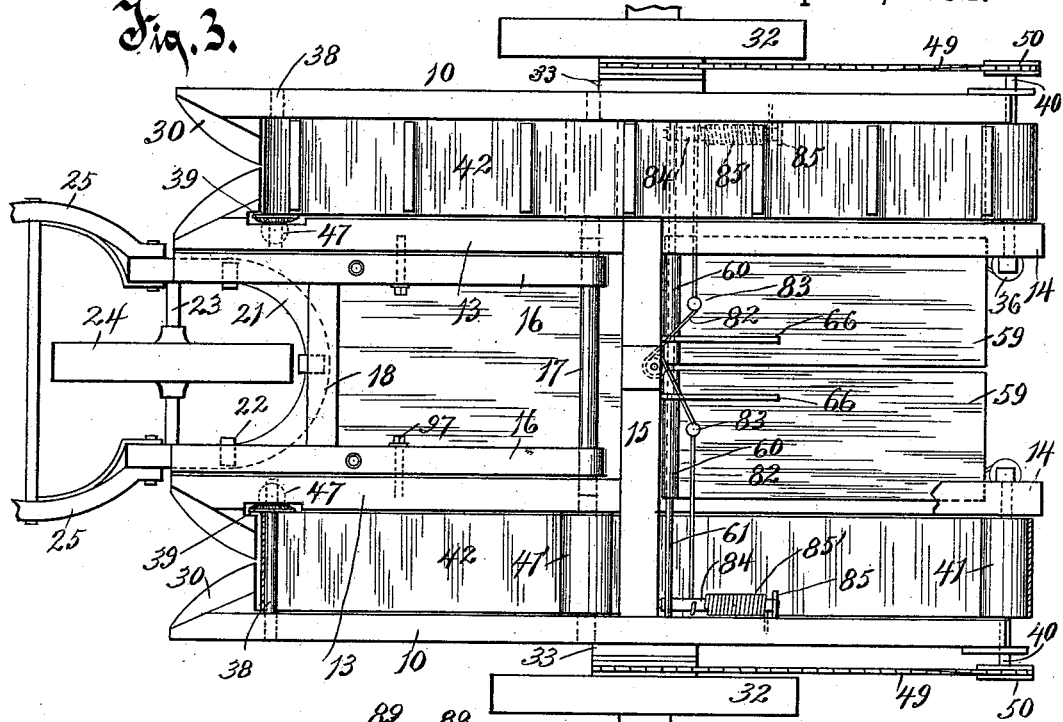
Figure 4:
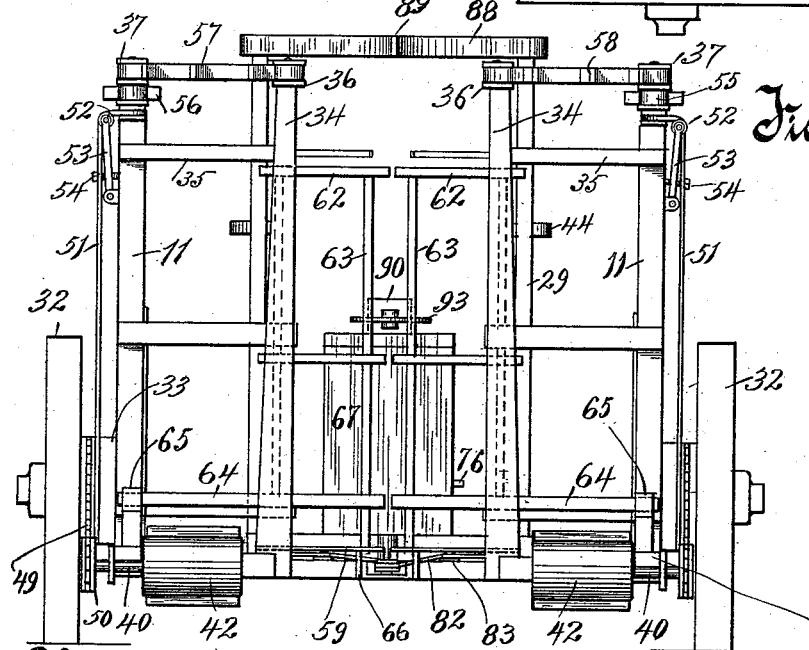
Figure 5:
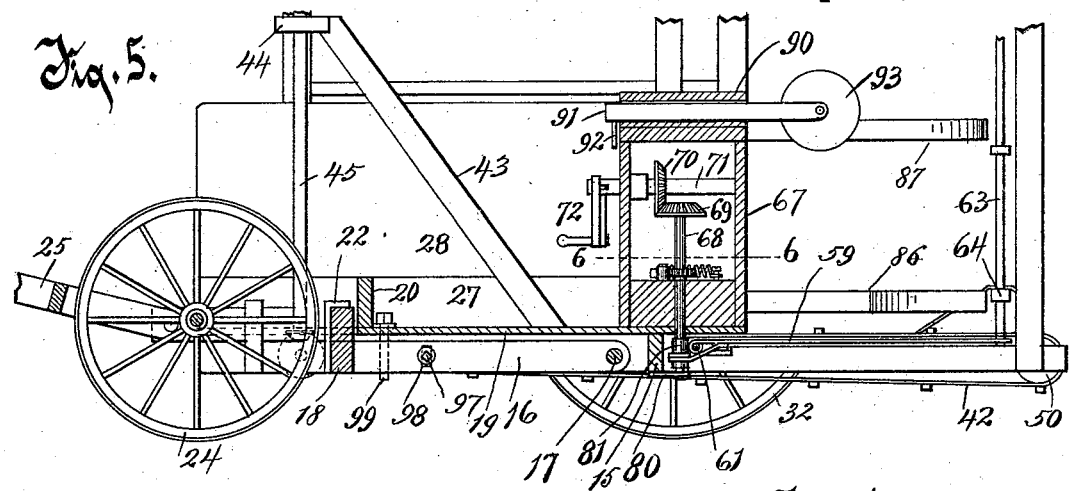
Figure 6:
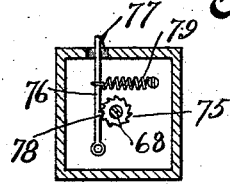
Figure 7:
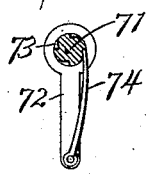
Figure 8:
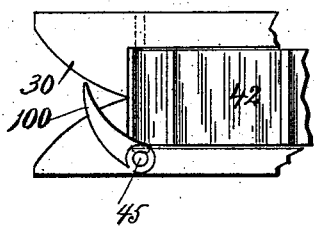
Figure 9:
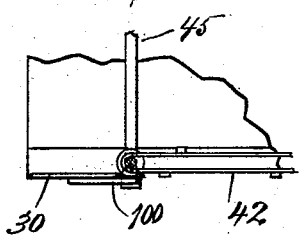

In the accompanying drawings, Figure 1, is a top plan view of the complete machine. Fig. 2, is a side elevation of the same. Fig. 3, is an inverted plan view, the under side of one of the endless carrier aprons being removed. Fig. 4, is a rear elevation. Fig. 5, is a central longitudinal vertical sectional view. Fig. 6, is a horizontal section on the line 6—6 of Fig. 5. Fig. 7, is a rear detail view of the operating handle for closing the sliding gates. Fig. 8, is an inverted plan of a fragment of the machine, at a point beneath one of the set of cutters, to illustrate a modification, and Fig. 9, is an edge view of Fig. 8, one of the knives and side bars being removed.

Referring to the drawings, the numerals 10, 10, indicate the side bars of the frame or body of the machine, from which project the uprights or standards 11, 11, which uprights or standards are connected by longitudinal brace or tie rods 12, 12.

Beneath the frame or body of the machine are forward and rear longitudinal beams 13 and 14, respectively, between the inner adjacent ends of which passes a cross bar 15, which bar joins the side bars 10 of the frame.

The numerals 16, 16 indicate longitudinal beams which are arranged between the forward longitudinal beams 13. The rear ends of these longitudinal beams 16 are connected by means of a transverse rod 17, the ends of which project laterally beyond the beams 16, and enter the beams 13, said extended ends thereby serving as trunnions upon which the outer frame may turn. The beams 16 are connected medially by a transverse beam 18. A flooring 19, is supported upon the beams 13, 13 and 15 and said platform or flooring is provided on its upper side with an upward-extending strip 20. In front of this strip 20, and above the forwardly projecting ends of the beams 16, 16 is a yoke 21, said yoke secured to the strip 20, and to the beams 16 by means of clips 22, 22, 22, in such a manner that the yoke is freely rotatable horizontally. The ends of this yoke serve as journal bearings for a shaft 23, which shaft carries a front wheel 24. To the extremities of the yoke are pivoted shafts 25, 25.

Secured to the inner edges of the side bars 10, 10 are side boards 26, 26, which at their forward ends are curved outward. The platform or flooring has also projecting upward therefrom side strips 27, 27, upon the upper edges of which rest side boards 28, 28, the forward ends of which side boards extend beyond the side strips 27, and are flared or bent inward, so as to form between the same and the outward bent side boards 26, 26, flaring mouths at the front of the machine. The rear ends of the side boards 28, 28, are secured to uprights or standards 29, 29, at the rear of the platform or flooring 19. The front ends of the side bars 10, 10 and the forward longitudinal beams 13, have attached thereto cutting blades 30, which blades are beveled outward, so as to form flaring spaces between the respective sets of blades.

Projecting laterally from the rear uprights or standards 11, are short shafts or trunnions 31, 31, upon which are mounted driving wheels 32, 32, the hubs 33, 33, of said wheels being doubly grooved.

Connected to the rear extremities of the longitudinal beams 14 are uprights or standards 34, 34, said standards being disposed rearward in a diagonal line from the rear uprights 11, and connected thereto by horizontal brace rods 35, 35. Small singly grooved pulley wheels 36, 36 are mounted horizontally in the upper ends of the front uprights 11, and rear uprights 34, and three grooved pulleys 37 in the upper ends of the intermediate uprights 11.

At the forward end of the machine, and mounted in the side bars 10 and the forward longitudinal beams 13, are transverse shafts 38, 38, which shafts carry on their inner ends next to the beams 13, 13 beveled friction wheels or gears 39, 39. At the rear of the machine, and mounted in the side bars 10 and rear longitudinal beams 14, are transverse shafts 40, 40, which have rigidly mounted thereon rollers 41, 41. Intermediate the front and rear shafts 38 and 40 are mounted rollers 41', 41'. Around these rollers, and around the shafts 38 and 40, on opposite sides of the machine, pass endless transversely-slatted belts 42, 42.

Projecting from the flooring or platform 19 forwardly at inclines are standards 43, 43, which are formed or provided at their upper ends with circular apertured blocks 44, 44, which form bearings for vertical shafts 45, 45, the upper ends of said shafts being provided with curved gathering fingers 46, 46, while the lower ends of the shafts are seated revolubly in sockets in the beams 13, 13, and carry slightly above their lower ends, beveled friction wheels or gears 47, 47, which mesh with the beveled friction wheels or gears 39, 39, and receive rotation therefrom. Projecting forward from the upper ends of the front standards or uprights 11, are outward curved fingers 48, 48 which serve to guide the upper ends of the stalks properly in the passage ways.

Running around the outermost toothed grooves of the hubs 33, 33 are crossed sprocket chains 49, 49, said chains running rearward to and around sprocket wheels 50, 50 rigidly mounted upon the outer ends of the rear shafts 40, 40. Around the innermost grooves of the hubs 33, 33 are cords or belts 51, 51, which are crossed near their upper ends, and passed over grooved guide pulleys 52, 52 journaled in the upper ends of arms 53, 53. These arms have their lower ends pivoted to the medial uprights 11, 11, and are provided above their pivots with threaded apertures, through which adjusting screws 54, 54 pass and enter the uprights. By turning these screws in the proper direction it is evident that the tension of the endless cords or belts 51, may be either increased or decreased by the outward or inward movement of the upper ends of the arms carrying the guide pulleys.

Passing around the singly grooved pulleys 36 at the upper ends of the forward standards 11, and around and into one of the grooves of the pulleys 37 at the upper ends of the rear standards 11, are endless belts 55, 55, provided with transverse slats 56, 56. Into other of the grooves of the pulleys 37 are passed endless belts 57, 57, which are extended to and pass around the singly grooved pulleys mounted on the tops of the standards 34, 34. These belts are also provided with transverse slats 58.

To the rear of the floor or platform 19 are sliding horizontal gates 59, 59, which are provided at their front with loops or eyes 60, 60 through which passes a transverse rod 61, having its ends secured in the side bars 10, 10 of the frame.

Located in front of the rear uprights 34, 34 are vertical gates 62, 62, the inner vertical posts 63, 63 thereof projecting down and secured to the horizontal gates 59, 59, so that when said horizontal gates are moved, the vertical gates are carried therewith. The lower horizontal beams 64, 64 of the vertical gates are extended laterally, and pass freely through bearings 65, 65 arranged on the top edges of the side bars 10, 10. Beneath the horizontal gates 59, 59 and projecting rearward from the cross bar 15, are arms 66, 66 which arms serve to support the horizontal gates 69, when said gates are depressed by the weight of the corn stalks thereon.

Mounted on the platform or flooring 19, to the rear thereof, is a rectangular box 67. Within this box is a vertical shaft 68, said shaft carrying on its upper end a beveled gear 69, said beveled gear meshing with a similar gear 70 carried by a horizontal shaft 71, said shaft having its bearings in the sides of the box, and having one end extending laterally outside of the box to receive an operating handle 72. The handle 72 is mounted loosely on the end of the shaft, and back of the handle, and formed integral with the shaft are a series of teeth 73, shown clearly in Fig. 7. The handle has secured thereto a pawl or detent 74, the free end of which is adapted to engage with the teeth. From this construction it will be seen that the handle 72 will rotate the horizontal shaft 71, only when said handle is turned in one direction. The vertical shaft 68 is provided about centrally, just above the bottom of the box 67, with a ratchet 75. To the bottom of the box is pivoted an arm 76, the free end of which arm projects through an opening 77 in the box. Medially the arm 76 is provided with a tooth 78, which is normally held in engagement with the teeth of the ratchet by means of a coiled spring 79, one end of said spring attached to the bottom of the box, and the opposite edge attached to the arm. The vertical shaft 68 extends through the bottom of the box, and has its lower end stepped in a bearing plate 80, which bearing plate projects from the under side of the cross bar 15. This lower end of the shaft 68 is formed into a cylindrical enlargement or drum, 81 to which the ends of cords 82, 82 are attached. These cords extend outward, and are secured at 83, 83 to the under sides of the horizontal gates 59, 59. The outer extremeties of these cords are secured to longitudinally arranged drums 84, 84, having one of their ends mounted in bearings 85, 85 projecting inward from the side bars 10, 10, and having their other ends turning in the cross bar 15. These drums are encircled by coiled springs 85', 85', said springs having one of their ends secured to the side bars 10, 10, and their other ends secured to the drums. In order to operate the horizontal gates 59, 59, all that is necessary to be done is to press with the finger on the protruding end of the arm 76, so as to throw the tooth 78 of said arm out of engagement with the teeth of the ratchet 75. The moment this occurs the vertical shaft 68 is free to rotate, and this it does in a direction necessary to produce a slack in the cords 82, 82. The moment this slack occurs, the coil springs 85', 85' acting upon the drums 84, 84 will wind the cords 82 up upon said drums, and consequently draw the horizontal gates outward toward the side bars 10, 10. When the vertical shaft 68 turns in the manner just described, the direction of its rotation is such as to allow the pawl or detent 74 of the operating handle 72 to slip past the teeth 73, and consequently allow the horizontal shaft 71 to turn without effecting the handle. When it is desired to close the horizontal gates 59, or to bring the same to the position illustrated in Fig. 3, all that is necessary to be done is to turn the operating handle 72 in the proper direction to insure the engagement of the dog or detent 74 with the teeth 73 of shaft 71. This will have the effect, of course, of rotating said shaft 71, and through the bevel gear 70 thereof intermeshing with the gear 69 of shafts 68, will also impart rotation to the latter shaft, and cause the cords 82, 82 to be wound upon the drum 81, against the tension of the springs 85' of the drums 84, and consequently unwind from the latter drums. As the cords are thus wound up upon the drum 81, of course the horizontal gates are drawn inward.

To the rear uprights 11, 11 are attached inwardly bent lower flexible arms 86, 86, and above these arms other flexible arms 87, 87 preferably curved outward.

The upper ends of the standards 29, 29 are connected by means of a transverse rod 88, said arm having projecting rearwardly and centrally therefrom an arm 89, said arm serving to separate the stalks which are carried by the endless traveling belts upon opposite sides of the machine.

The top of the rectangular box 67 is provided with a bearing 90 through which an arm 91 passes freely. This arm is provided upon its forward end with a suitable handle 92, and on its rear end with a disk 93. The normal position of this disk is horizontal, as illustrated in Fig. 1, whereby the corn stalks are converged at their upper ends, and diverged at their lower ends, to form a broad base. When the rear of the machine has received the requisite number of corn stalks, however, and it is desired to deposit the stalks butt down on the surface of the earth, after having been tied the disk is turned at right angles, as indicated in Fig. 5, so that when the horizontal gates 59 are opened, the corn stalks may freely fall to the ground.

On the front edges of the standards 29, 29 are brackets 94, 94 in which brackets are journaled horizontally mounted rollers 95, 95. Around these rollers pass endless belts 96, 96, which belts also pass around the vertical front shafts 45, 45.

The frame of the machine, excepting the longitudinal beams 16, 16, is capable of an up and down adjustment, said frame turning on the transverse rod 17. Bolts 97, 97 also pass through elongated slots 98, 98 in the longitudinal beams 16, and enter the forward longitudinal beams 13. The up and down movement of the swinging portion of the frame, is, therefore, limited to the length of the elongated slots 98, 98. In order to adjust the up and down movement of the swinging portion of the frame of the machine, vertical screws 99, 99, are employed, said screws passing through the flooring or platform 19, and entering the longitudinal beams 16, 16. The object of providing for this adjustment of the frame of the machine, is to bring the cutting knives closer to or farther away from the surface of the ground, so as to provide for cutting the corn stalks at varying heights.

In Figs. 8 and 9 is represented a slight modification of my invention, in which the lower ends of the vertical shafts 45, 45 are shown as extending below the frame of the machine, and provided with radially extending cutting knives 100. These knives are brought in close proximity to the under side of the fixed cutting blades 30, so that as said knives are rotated with the vertical shafts 45, they will, in connection with the cutting blades 30, make a shearing cut. These rotatable knives may be employed to advantage, in view of the fact that the severance of the corn stalks is thereby insured. Where rotary cutters of this kind are not provided, it is possible for the corn stalks to pass by the stationary cutting blades without being severed thereby.

In the operation of my machine, as the same traverses the ground, rotation is imparted to the endless carrier belts 42, 42, the belts 55, 55, belts 57, 57, and to the vertical shafts 45, in an obvious manner. The machine runs between two rows of growing corn, and as it advances, the curved rotatable fingers 46 gather the stalks in to the flaring mouths of the passage ways for the endless carrier belts. The cutting blades 30 then act upon the stalks and sever the same, depositing the butts of the stalks upon the carrier belts 42, while the upper end of the stalks will fall against the belts 55 and 96. The stalks are then carried rearward until they reach the flexible fingers 86 and 87, which direct them inward on to the horizontal gates 59, the other endless belts 57 facilitating this action. When the stalks are thus deposited on the horizontal gates, as soon as a sufficient number has been collected thereon, the separate divisions thereof are tied into shocks, after which the arm 91 is turned so as to bring the disk 93 to the position shown in Fig. 5, and the mechanism for opening the horizontal gates 59, and simultaneously the vertical gates 62, 62, is operated in the manner hereinbefore pointed out, and the tied shocks deposited on the surface of the ground.

Having thus described my invention, what I claim, and desire to secure by Letters Patent, is—

1. In a corn harvester, the combination of cutting mechanism, horizontal gates, a shaft carrying a ratchet, means for actuating said shaft, a pivoted arm provided with a tooth normally engaging the ratchet, a spring having one end attached to the pivoted arm, oppositely disposed spring-retracted drums, cords secured to the shaft, medially to the under sides of the gates, and at their opposite extremities to the spring-retracted drums, and means for conveying the corn stalks from the cutting mechanism to the horizontal gates, substantially as set forth.

2. In a corn harvester, the combination, of cutting mechanism, horizontal gates, gates secured rigidly to, and projecting vertically from, the horizontal gates, said vertical gates provided with laterally-extending horizontal beams passing through bearings in the sides of the frame, a shaft carrying a ratchet, means for actuating said shaft, a pivoted arm provided with a tooth normally engaging the ratchet, a spring having one end attached to the pivoted arm, oppositely disposed spring-retracted drums, cords secured to the shaft, medially to the under sides of the gates, and at their outer ends to the spring-retracted drums, and means for conveying the corn stalks from the cutting mechanism to the horizontal gates, substantially as set forth.

3. In a corn harvester, the combination, of cutting mechanism, horizontal gates, a shaft carrying at one end a beveled gear and medially a ratchet, a shaft at right angles to the first-named shaft, and carrying medially a beveled gear meshing with the beveled gear of said first-named shaft, and also provided near its outer end with a series of teeth, a handle mounted loosely upon the outer end of this last named shaft, said handle provided with a dog or detent adapted to engage the teeth of the shaft when the handle is actuated in one direction, and to slip past the teeth of the shaft when actuated in the opposite direction, a pivoted arm provided with a tooth normally engaging the ratchet of the actuated shaft, a spring having one end attached to the pivoted arm, oppositely disposed spring-retracted drums, cords secured to the actuated shaft, medially to the under sides of the gates, and having their outer ends secured to the spring retracted drums, and means for conveying the corn stalks from the cutting mechanism to the horizontal gates, substantially as set forth.

4. In a corn harvester, the combination, of a frame, a casing projecting up from the platform thereof, cutting mechanism, horizontal gates, a shaft within the casing, and having its lower end projecting through the bottom thereof, said shaft carrying at one end a beveled gear, and medially a ratchet, a shaft projecting through the casing at right angles to the first-named shaft, said shaft provided on its outer end with an operating handle, and carrying within the casing a beveled gear meshing with the beveled gear of the first-named shaft, an arm pivoted to the bottom of the casing, said arm provided with a tooth normally engaging the ratchet, the free end of the arm projecting through an elongated opening in the casing, a spring having one end secured to the bottom of the casing, and its other end attached to the pivoted arm, oppositely disposed spring-retracted drums, cords secured to the end of the actuated shaft which projects through the bottom of the casing, said cords also secured medially to the under sides of the gates, and extended and secured to the spring-retracted drums, and means for conveying the corn stalks, from the cutting mechanism to the horizontal gates, substantially as set forth.

5. In a corn harvester, the combination, of a frame, a casing projecting up from the platform thereof, the top of said casing provided with a bearing, cutting mechanism, horizontal gates, a shaft within the casing, having its lower end projecting through the bottom thereof, said shaft carrying at one end a beveled gear, and medially a ratchet, a shaft projecting through the casing at right angles to the first-named shaft, said shaft provided on its outer end with an operating handle, and carrying within the casing a beveled gear meshing with the beveled gear of the first-named shaft, an arm pivoted to the bottom of the casing, said arm provided with a tooth normally engaging the ratchet, the free end of the arm projecting through an elongated opening in the casing, a spring having one end secured to the bottom of the casing, and its opposite end secured to the pivoted arm, oppositely disposed spring-retracted drums, cords secured to the end of the actuated shaft which projects through the bottom of the casing, said cords also secured medially to the under sides of the gates, and extended and secured to the spring-retracted drums, means for conveying the corn stalks from the cutting mechanism to the horizontal gates, and an arm rotatable in the bearing on the top of the casing, said arm provided on its rear end with a disk, said disk normally held horizontally, and adapted to be turned to a vertical position, when it is desired to discharge the corn stalks at the rear of the machine, substantially as set forth.

In testimony whereof I affix my signature in presence of two witnesses.

MARTINUS SORENSON.

Witnesses:
VICTOR BROWN,
CHR. SORENSEN.